United States Patent
Dajaku

(10) Patent No.: US 10,461,614 B2
(45) Date of Patent: Oct. 29, 2019

(54) ROTOR AND ELECTRICAL MACHINE

(71) Applicant: FEEAM GmbH, Neubiberg (DE)

(72) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 243 days.

(21) Appl. No.: 15/209,663

(22) Filed: Jul. 13, 2016

(65) Prior Publication Data

US 2017/0019004 A1 Jan. 19, 2017

(30) Foreign Application Priority Data

Jul. 15, 2015 (DE) .................. 10 2015 111 480

(51) Int. Cl.
| | | |
|---|---|---|
| *H02K 1/24* | (2006.01) | |
| *H02K 1/27* | (2006.01) | |
| *H02K 16/02* | (2006.01) | |
| *H02K 21/14* | (2006.01) | |

(52) U.S. Cl.
CPC .............. *H02K 16/02* (2013.01); *H02K 1/243* (2013.01); *H02K 1/2713* (2013.01); *H02K 1/2766* (2013.01); *H02K 21/14* (2013.01)

(58) Field of Classification Search
CPC ............ H02K 1/02; H02K 1/27; H02K 1/243; H02K 16/02; H02K 21/14; H02K 1/12766; H02K 1/2713
USPC ......... 310/126, 156.37, 156.71, 156.66, 181, 310/263, 268
See application file for complete search history.

(56) References Cited

U.S. PATENT DOCUMENTS

| | | | | |
|---|---|---|---|---|
| 5,177,391 A | * | 1/1993 | Kusase ................ | H02K 16/02 310/114 |
| 6,236,134 B1 | * | 5/2001 | Syverson ............. | H02K 1/2773 310/156.53 |
| 6,437,477 B1 | * | 8/2002 | Krefta ................. | H02K 21/044 310/156.66 |
| 6,455,978 B1 | * | 9/2002 | Krefta ................. | H02K 21/044 310/156.66 |

(Continued)

FOREIGN PATENT DOCUMENTS

| | | |
|---|---|---|
| CN | 100442637 C | 12/2008 |
| CN | 102377264 A | 3/2012 |

(Continued)

OTHER PUBLICATIONS

"Commodity Prices", retrieved from <http://www.allianceorg.com/magnetandmaterialcosts.htm> on Jul. 16, 2015, Alliance LLC, Neodymium Pricing Formulas, 3 pages.

(Continued)

*Primary Examiner* — John K Kim
(74) *Attorney, Agent, or Firm* — Morgan, Lewis & Bockius LLP

(57) ABSTRACT

A rotor for an electrical machine is provided, comprising a main rotor (2), which can be rotated about a longitudinal axis (3) and which is free of permanent magnets, and having an auxiliary rotor (5), which comprises at least one axial flux rotor (6), which can also be rotated about the longitudinal axis (3) and is arranged in axial direction adjacent to the main rotor (2), in which the axial flux rotor (6) comprises permanent magnets (8). Furthermore, an electrical machine with the rotor (2, 5) and a stator (1) is provided.

8 Claims, 12 Drawing Sheets

(56) References Cited

U.S. PATENT DOCUMENTS

Figure 1:
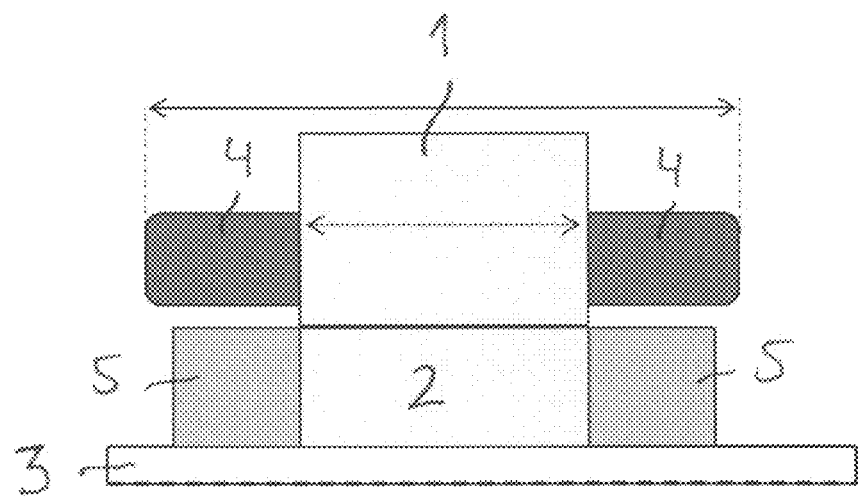

| | | | |
|---|---|---|---|
| 6,538,358 B1* | 3/2003 | Krefta | H02K 21/044 |
| | | | 310/263 |
| 7,560,837 B2* | 7/2009 | Umeda | H02K 7/11 |
| | | | 310/105 |
| 2003/0227231 A1* | 12/2003 | Ostovic | H02K 16/04 |
| | | | 310/254.1 |
| 2004/0012354 A1* | 1/2004 | Krefta | F02N 11/00 |
| | | | 318/400.41 |
| 2005/0285467 A1* | 12/2005 | Shimizu | H02K 1/182 |
| | | | 310/156.35 |
| 2005/0285468 A1 | 12/2005 | Fukushima et al. | |
| 2013/0113323 A1* | 5/2013 | Yamada | H02K 1/2706 |
| | | | 310/156.07 |
| 2013/0241335 A1 | 9/2013 | Vollmer | |
| 2013/0307367 A1* | 11/2013 | Yoshida | H02K 3/26 |
| | | | 310/198 |
| 2014/0035394 A1 | 2/2014 | Nadeau et al. | |
| 2014/0285921 A1 | 9/2014 | Lee et al. | |
| 2017/0019004 A1* | 1/2017 | Dajaku | H02K 21/14 |

FOREIGN PATENT DOCUMENTS

| | | |
|---|---|---|
| CN | 102842974 A | 12/2012 |
| CN | 103312066 A | 9/2013 |
| CN | 104300761 A | 1/2015 |
| EP | 1612913 A2 | 1/2006 |
| WO | WO-2013075288 A1 | 5/2013 |

OTHER PUBLICATIONS

Ivankovic, R. et al., "Power Electronic Solutions to Improve the Performance of Lundell Automotive Alternators", New Advances in Vehicular Technology and Automotive Engineering, InTech, 2012, pp. 169-190.

Marlino, L. et al., "Electric Motors and Critical Materials Breakout", EV Everywhere Grand Challenge, Electric Drive (Power Electronics and Electric Machines) Workshop, Jul. 24, 2012, 11 pages.

* cited by examiner

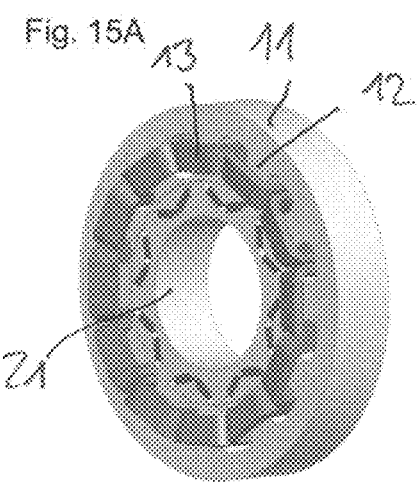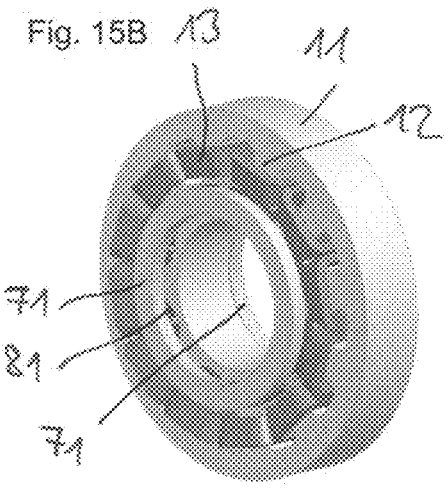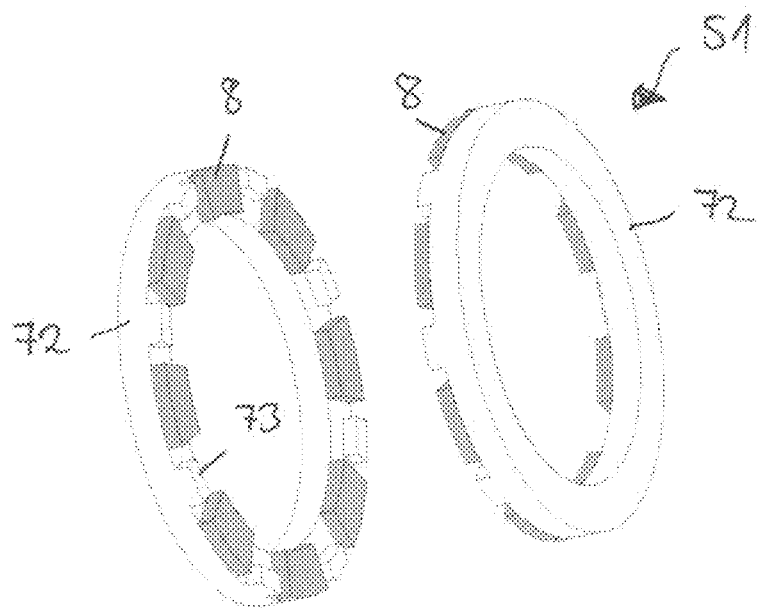

ROTOR AND ELECTRICAL MACHINE

The invention relates to a rotor for an electrical machine as well as an electrical machine with the rotor.

Electrical machines usually comprise a stator and a rotor mounted in a moveable manner relative thereto. In the event of a rotating electrical machine, the rotor can be rotated about a longitudinal axis.

Electrical machines can be motor or generator operated.

Two types of winding can typically be used for the stator winding in radial flux machines, namely the tooth-concentrated winding or the distributed winding. While the tooth-concentrated winding is distinguished by high efficiency, shorter winding heads, lower production costs and a higher slot-filling factor, distributed windings have the advantage of a more sinusoidal magnetomotive force and thus better machine performance, for example with respect to vibrations and running noises.

Distributed windings are still widely used today as driving machines in electric vehicles. However, due to the distributed winding and the associated need for large winding heads, two thirds of the machine length is typically provided for the winding heads, and therefore only a third of the entire axial machine length remains as active length, meaning the usable area for generating torque and power.

This inevitably means that this type of machine has to be assessed as inefficient, at least with respect to the exploitation of the available installation space. The rotor of such a machine is thereby typically a radial flux rotor with permanent magnets.

The problem addressed by the present invention is that of providing a rotor for an electrical machine, which is suitable for use in electric vehicles, for example, and thereby exploits the available installation space more efficiently.

This problem is solved by a rotor for an electrical machine with the features of claim 1. Embodiments and advantageous developments are indicated in the dependent claims.

In one embodiment a rotor for an electrical machine is provided. The rotor comprises a main rotor, which can be rotated about a longitudinal axis, and an auxiliary rotor, comprising an axial flux rotor, which can also be rotated about the longitudinal axis and is arranged in axial direction adjacent to the main rotor. The main rotor is free of permanent magnets. The auxiliary rotor comprises at least one permanent magnet.

According to the proposed principle, the rotor of an electrical machine, designated as main rotor herein, is supplemented by an auxiliary rotor, comprising at least one axial flux rotor. Said auxiliary rotor is arranged in axial direction directly or indirectly adjacent to the main rotor.

The previously unused area below the winding heads of the machine in the area of the rotor is exploited as a result, thus perceptibly increasing the flux density of the rotor.

The main rotor can be designed conventionally, for example as a radial flux rotor.

In a preferred embodiment the auxiliary rotor comprises in each case one axial flux rotor, which is arranged axially on both sides of the main rotor, which can be rotated about the same axis as the main rotor and is in each case secured on the main rotor.

Possible configurations of the auxiliary rotor and of the main rotor, with permanent magnets or in other designs for example, are explained in more detail later.

The auxiliary rotor enables the flux density of the main rotor to be amplified. The way the amplification works is explained later by way of example on the basis of detailed exemplary embodiments.

The at least one axial flux rotor of the auxiliary rotor can, for example, comprise an annular rotor core. Here, the permanent magnets are axially secured on the annular rotor core and distributed along the circumference of the axial flux rotor. The permanent magnets are preferably oriented in such a way that north and south poles alternate in the circumferential direction.

In one embodiment, the annular rotor core, on which the permanent magnets are secured, is an iron core. Said iron core serves as a rotor yoke.

The permanent magnets can, for example, comprise rare earths or ferrite magnets. Whereas rare earths enable a very high power density, ferrite magnets offer the advantage of lower costs. By the combination of permanent magnets comprising rare earths, and permanent magnets comprising ferrite magnets, in the auxiliary rotor allows the machine to be designed in a very flexibly adjustable manner to meet the desired requirements with regard to power density and costs.

Instead of conventional—e.g. configured in planar fashion—permanent magnets, these permanent magnets can be designed v-shaped.

The proposed principle of a rotor for an electrical machine can be advantageously used as driving machine in electric vehicles. A generator operation is of course no problem whatsoever for braking energy recovery or recuperation, for example.

Another exemplary intended use of the machine is the motor vehicle alternator. This conventionally comprises a claw pole rotor with a field winding. Here too, the at least one auxiliary rotor serves to increase the flux density of the main rotor. If the axial flux rotor of the auxiliary rotor comprises an annular rotor core, on which the permanent magnets are secured in axial direction, it is advantageous to arrange lateral teeth between the permanent magnets. Such teeth are assigned to the teeth of the main rotor and geometrically oriented towards the latter in each case.

Further details and configurations of the proposed principle are provided in the dependent claims.

Figure 2:
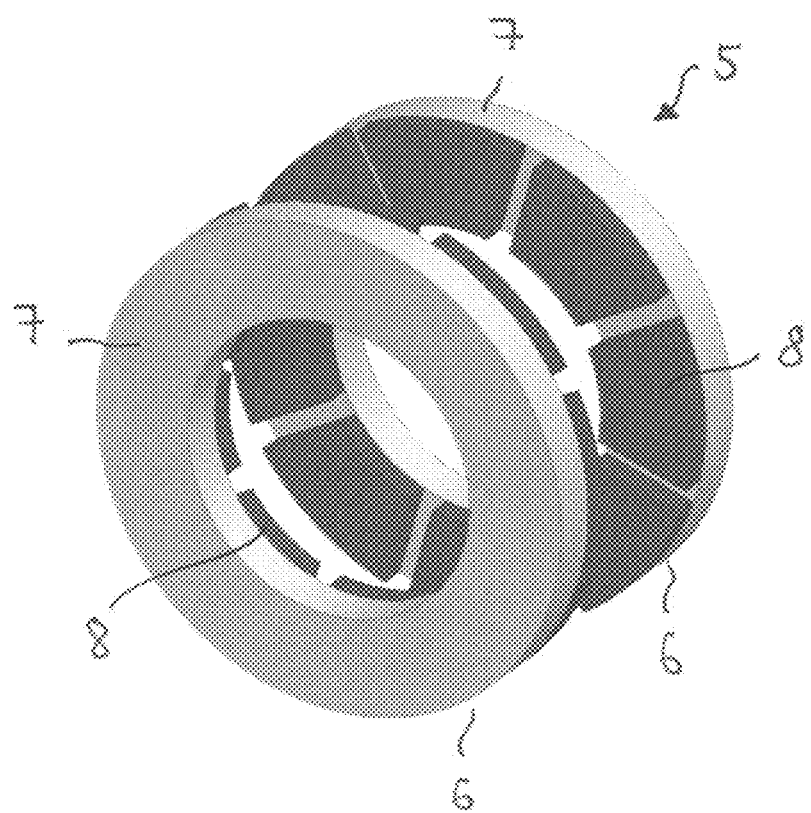
Figure 3:
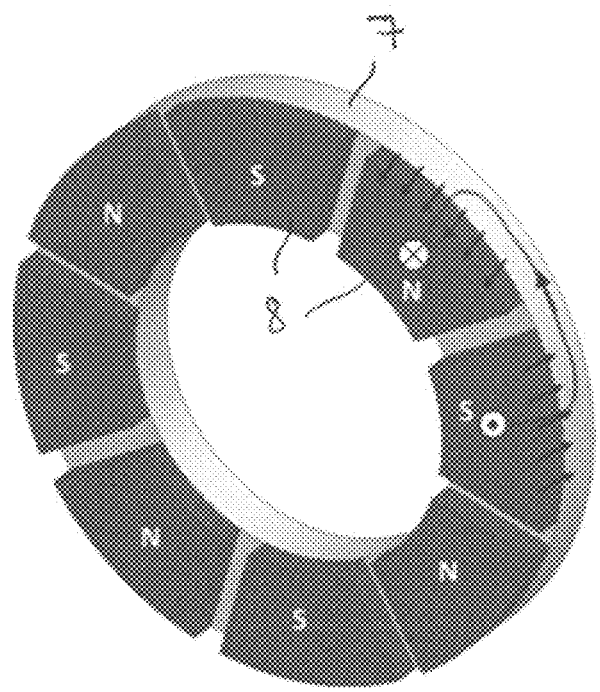
Figure 4:
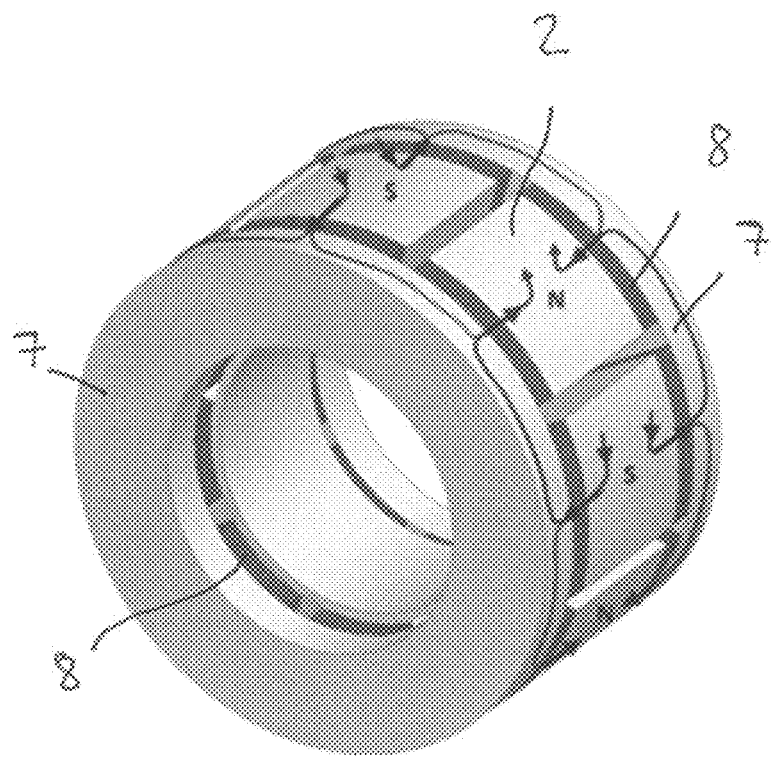
Figure 5:
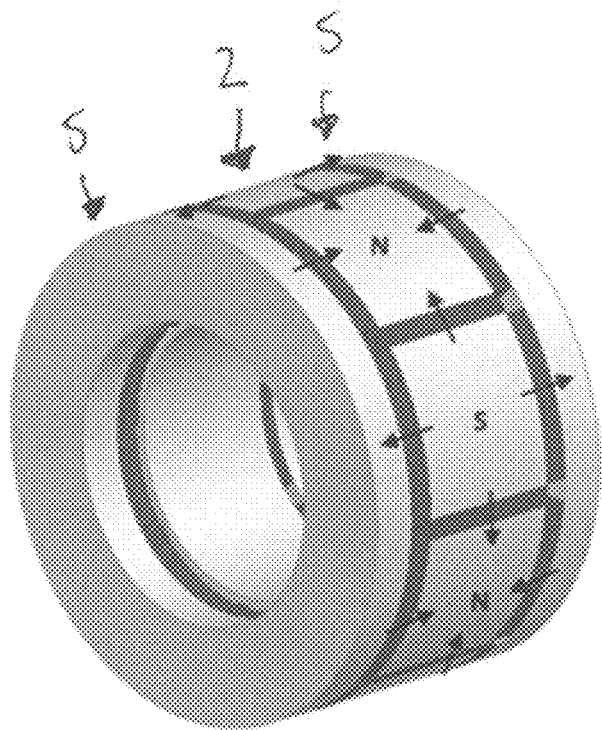
Figure 6:
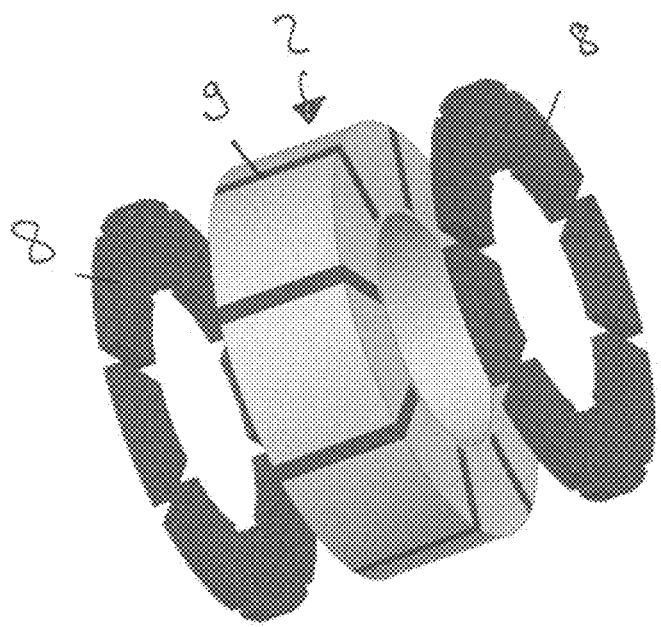
Figure 7:
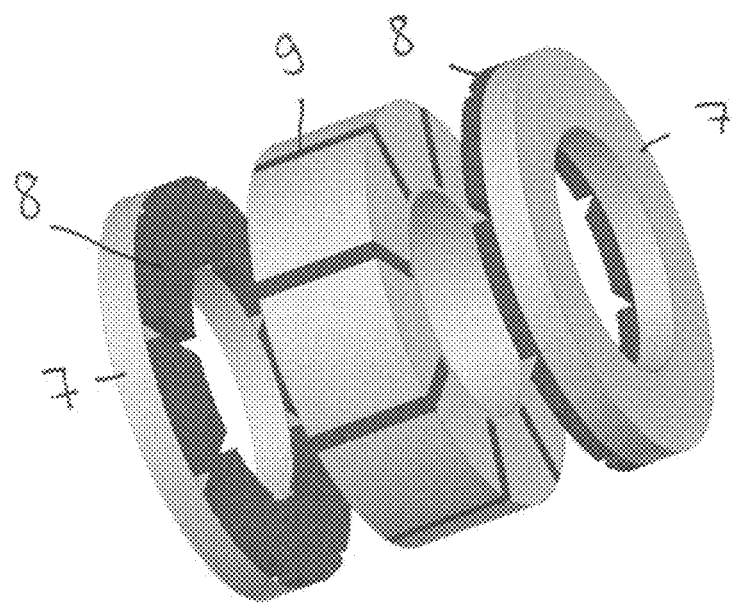
Figure 8:
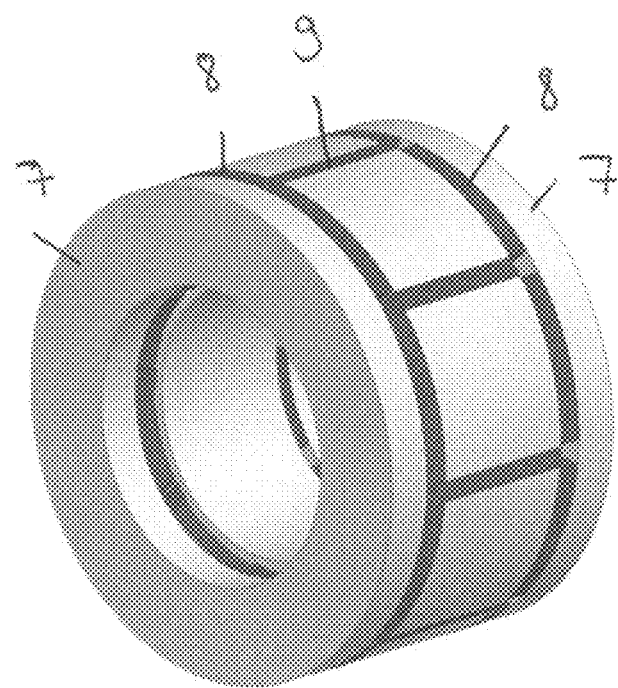
Figure 9A:
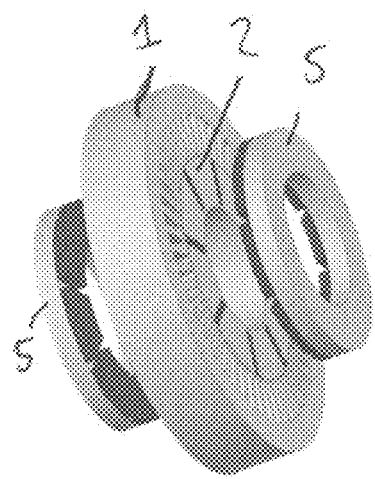
Figure 9B:
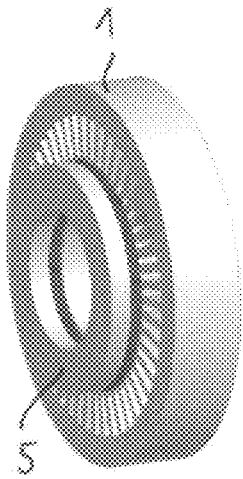
Figure 9C:
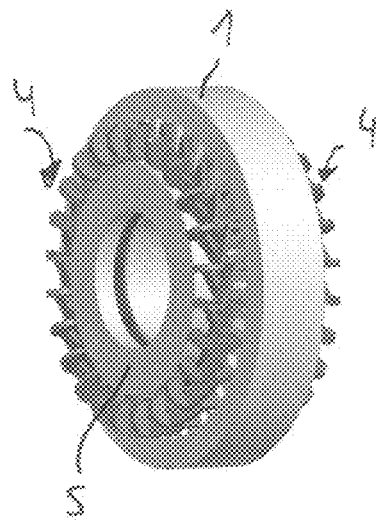
Figure 10A:
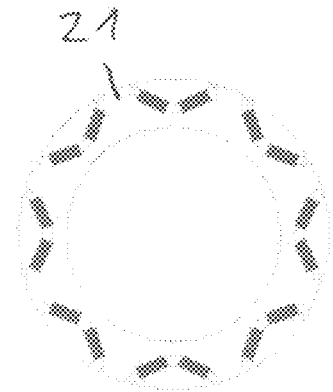
Figure 10B:
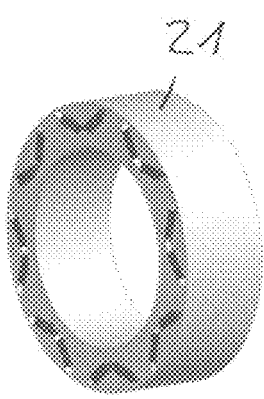
Figure 10C:
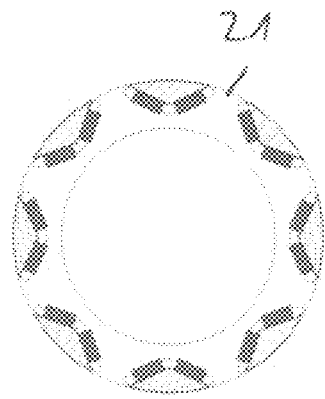
Figure 11A:
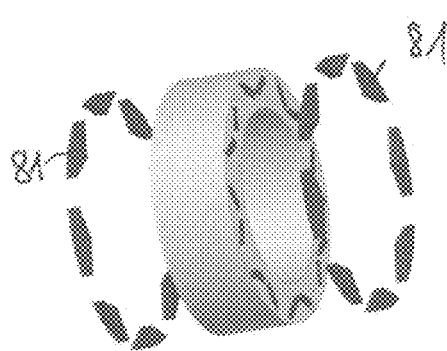
Figure 11B:
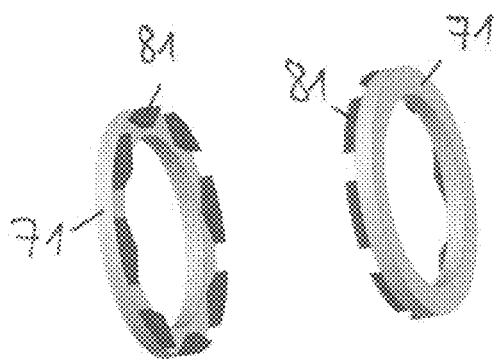
Figure 12A:
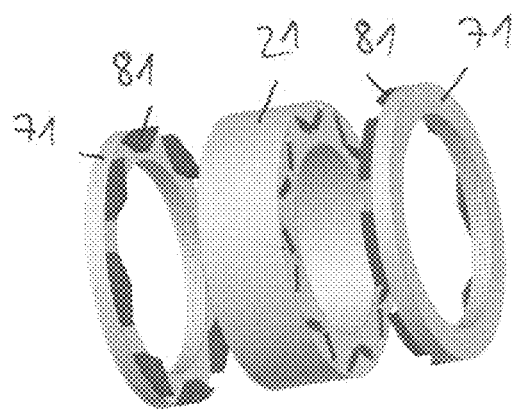
Figure 12B:
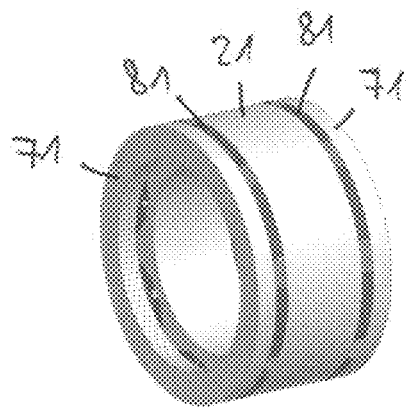
Figure 13A:
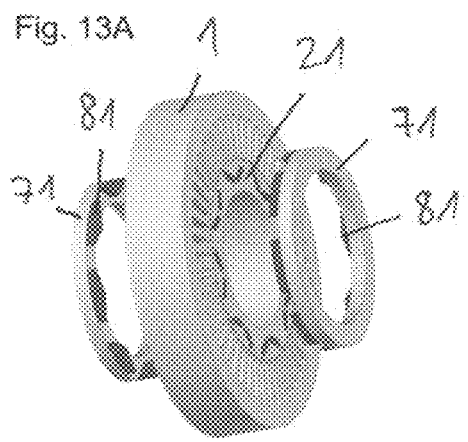
Figure 13B:
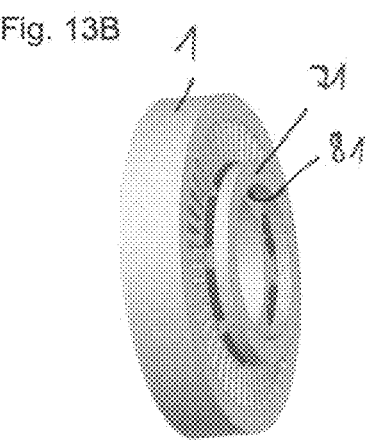
Figure 14A:
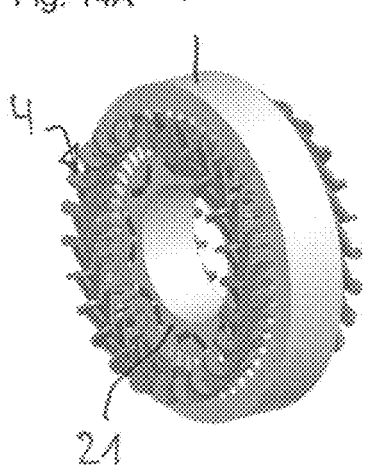
Figure 14B:
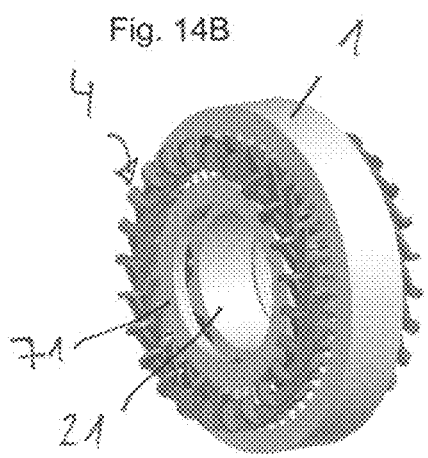
Figure 17:
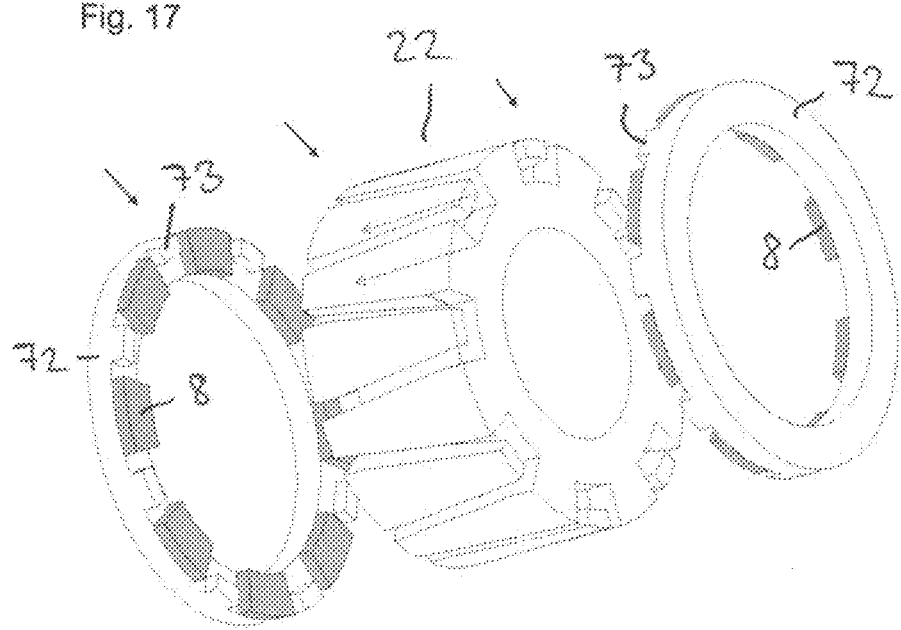
Figure 18:
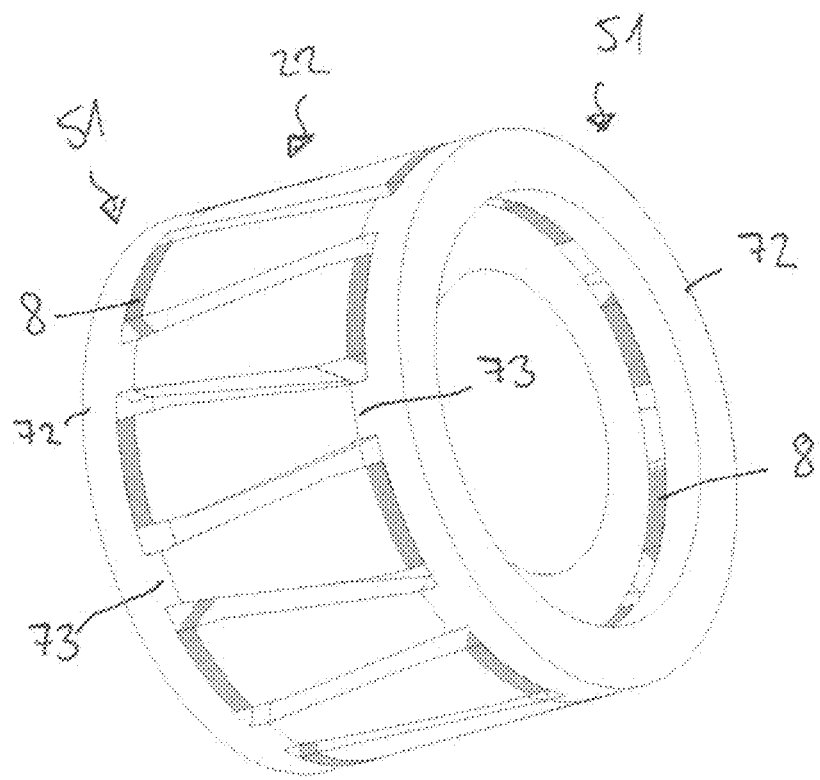
Figure 19:
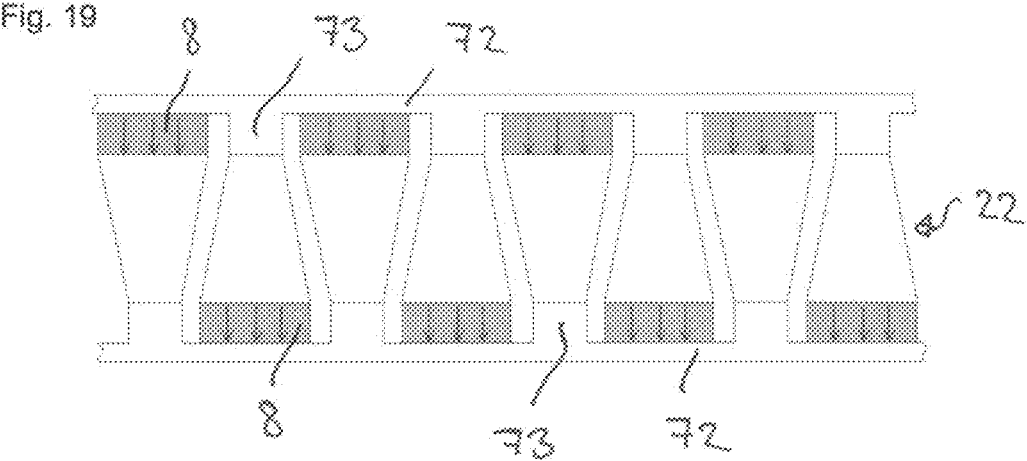
Figure 20:
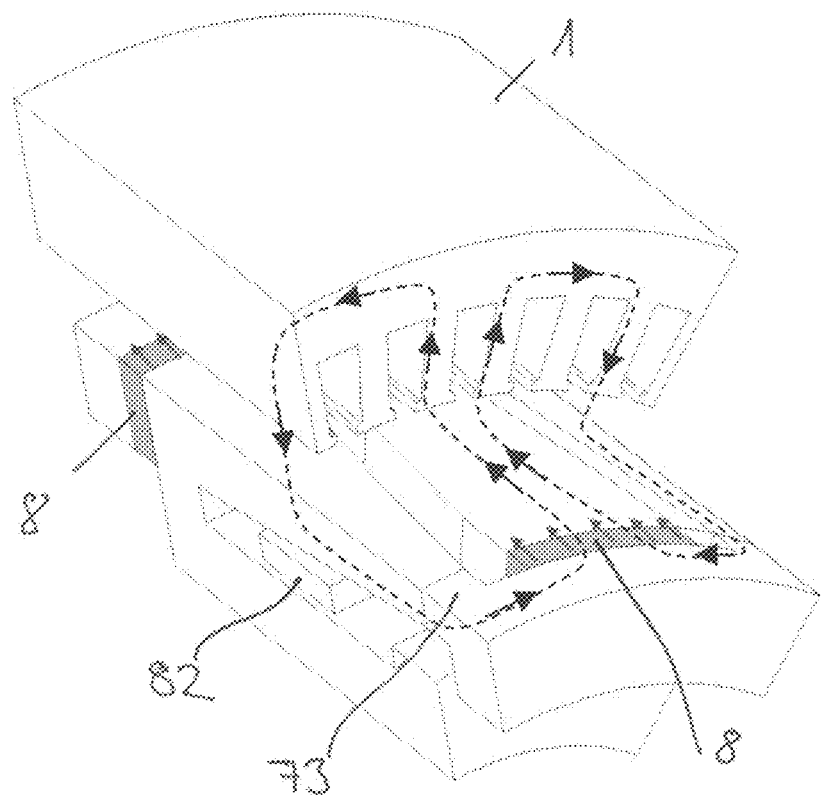
Figure 21:
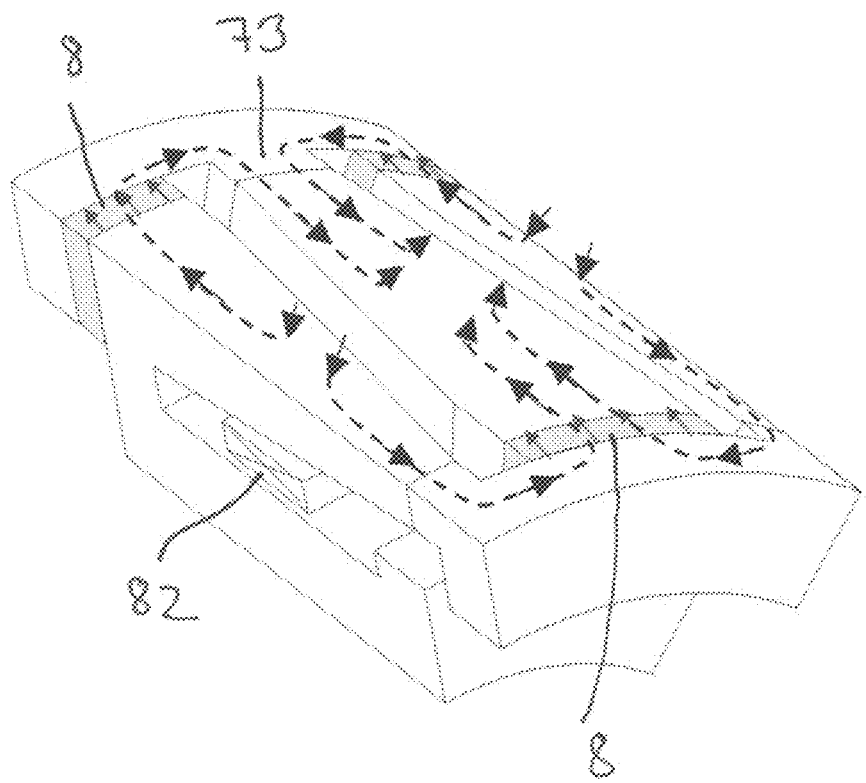
Figure 22:
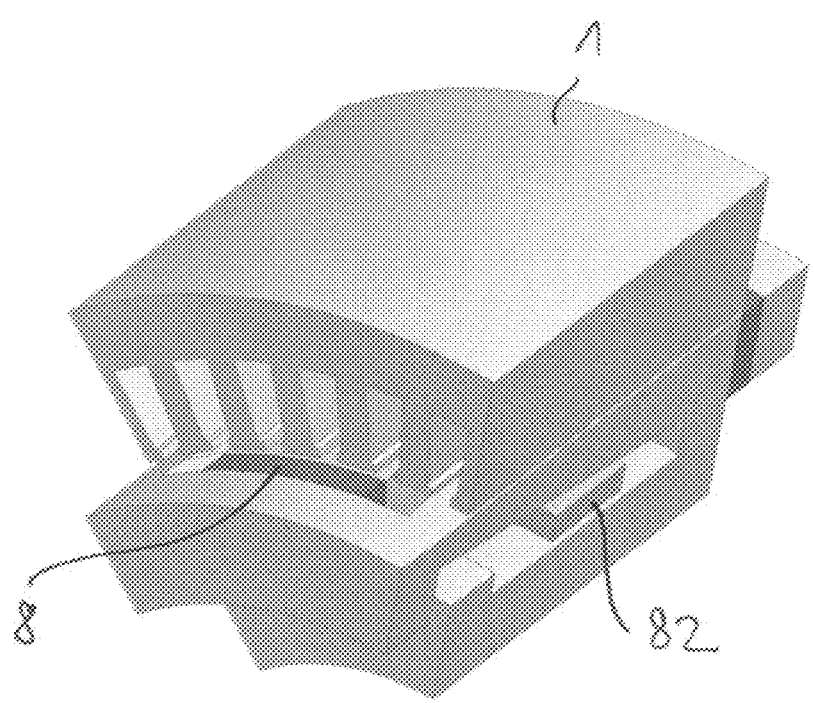
Figure 23:
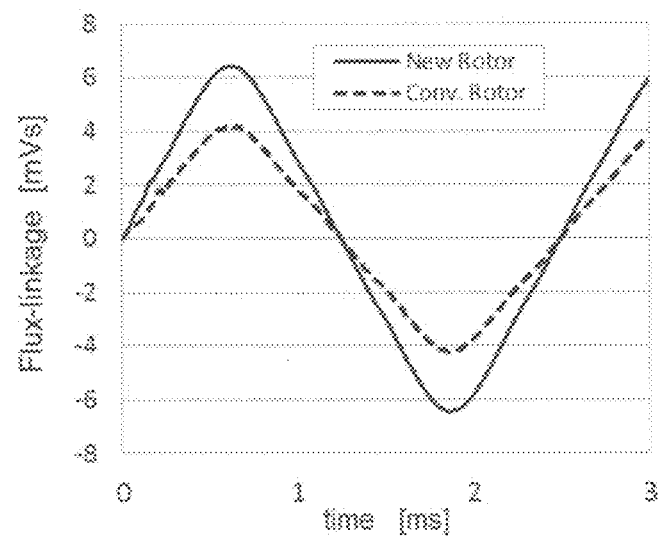
Figure 24:
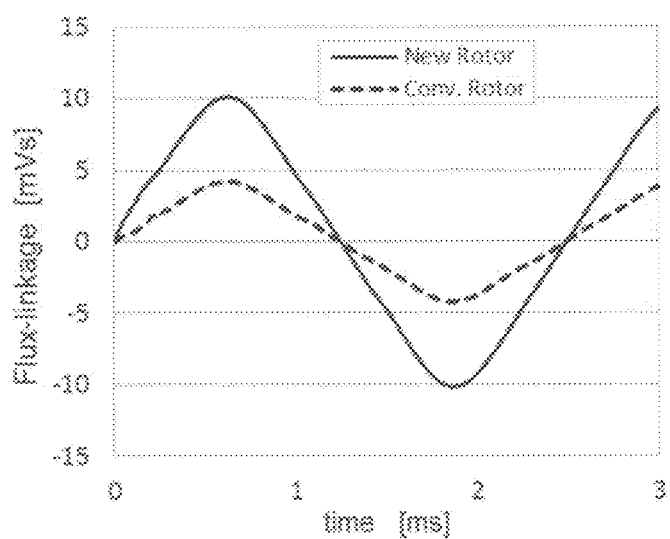

FIG. 1 shows an exemplary embodiment of a partial cross-section of an electrical machine according to the proposed principle, FIG. 2 shows an exemplary perspective illustration of an auxiliary rotor comprising two axial flux rotors according to the proposed principle, FIG. 3 shows an example of an exemplary embodiment of the magnetization of the permanent magnets of the axial flux rotor, FIG. 4 shows an example of the flux paths for the components of the axial flux rotor, FIG. 5 shows a perspective view of an exemplary embodiment of a rotor according to the proposed principle with permanent magnets, FIGS. 6 and 7 show an example of two consecutive steps in a production process of a rotor according to the proposed principle, FIG. 8 shows an exemplary embodiment of rotor according to the proposed principle;

FIG. 9A shows various perspective views of an exemplary embodiment of an electrical machine according to the proposed principle, wherein FIG. 9 A shows the rotor pursuant to FIG. 7 and a stator, FIG. 9B shows the assembled rotor according to FIG. 8 and the stator and FIG. 9C additionally shows the stator with stator winding;

FIG. 10A to 10C show possible embodiments of the main rotor with v-shaped magnets, FIGS. 11A and 11B each show exemplary embodiments of components of the auxiliary rotor, FIGS. 12A and 12B show an embodiment of the rotor with v-shaped magnets before and after assembly, FIGS. 13A and 13B show an embodiment of an electrical machine with stator and rotor, FIGS. 14A and 14B show an exemplary electrical machine according to the proposed principle before and after the assembly of the auxiliary rotor, FIGS. 15A and 15B show an embodiment of an electrical machine according to the proposed principle with concentrated winding before and after the assembly of the auxiliary rotor, FIG. 16 shows an exemplary embodiment of the auxiliary rotor for a claw pole machine, FIG. 17 shows an example of a main rotor and auxiliary rotor of a claw pole machine before assembly, FIG. 18 shows the embodiment of FIG. 17 after assembly, FIG. 19 shows the rotor in FIG. 18 in an unwound state, FIG. 20 explains the flux path by way of an example, FIG. 21 explains the magnetic flux path by way of another example, FIG. 22 shows an exemplary section of an embodiment of a claw pole machine according to the proposed principle, and FIGS. 23 and 24 explain the magnetic flux linkage by way of diagrams, with ferrite magnets in the rotor in FIG. 23 and with neodymium magnets in the rotor in FIG. 24.

FIG. 1 shows an exemplary embodiment of an electrical machine according to the proposed principle by way of a section of a cross-section through the machine axis. The electrical machine comprises a stator 1 and a main rotor 2. The main rotor 2 is mounted in a rotatable manner about an axis 3 relative to the stator 1. Winding heads 4 in each case axially project from the stator 1, which can reach significant axial dimensions in the event of a distributed winding, for example. An auxiliary rotor 5 is arranged below said winding heads 4, said auxiliary rotor 5 being arranged in axial direction on both sides of the main rotor and having at least one axial flux rotor.

The axial flux rotors of the auxiliary rotor are connected with the main rotor in a non-rotatable manner and can also be rotated about the axis 3.

In other words, the main rotor 2 has substantially the same axial extension as the stator 1 of the machine. In radial projection, the main rotor 2 is arranged below the stator 1. The auxiliary rotor 5 has an axial extension substantially corresponding to the extension of the winding heads 4 of the winding of the stator 1. The auxiliary rotor 5 is thus arranged below the winding heads 4 in radial projection.

The auxiliary rotor 5 serves to amplify the magnetic flux of the main rotor 2.

While the main rotor 2 is preferably designed as a radial flux rotor as in a conventional machine, the auxiliary rotor 5 comprises at least one axial flux rotor.

Main rotor and auxiliary rotor are securely connected to each other, thus running constantly with the same torque and having the same angle relative to each other.

The proposed principle uses the usually unexploited installation space below the winding heads 4 of an electrical machine, thus resulting in a particularly compact construction. The additional advantage is that the magnetic flux is perceptibly amplified compared with a conventional machine.

The productional effort for the proposed additional measures, namely for the auxiliary rotor, is very low. This means that the proposed principle of a rotor for an electrical machine can be cost-effectively produced.

FIG. 2 shows an exemplary embodiment of the auxiliary rotor 5.

The auxiliary rotor 5 comprises two axial flux rotors 6, each in turn comprising an annular rotor core 7 on which permanent magnets 8 are axially secured. The rotor core 7 is designed as an iron core in each case.

In the present example, the proposed annular rotor cores 7 have a substantially rectangular cross-section. Permanent magnets 8, alternately configured as north and south poles in the circumferential direction, are secured on each side of the rotor cores 7 of the axial flux rotors 5 facing the main rotor 2. Said permanent magnets 8 have a geometric extension, which is in each case perceptibly larger in both the radial and circumferential directions than in the axial direction. The permanent magnets 8 are of a flat design.

Other geometries of the permanent magnets are possible in alternative embodiments.

The permanent magnets 8 of each axial flux rotor are spaced apart from each other by an air gap, which substantially extends in a radial straight line. The rotor cores 7 terminate the permanent magnets 8 flush on both the external and internal diameters, thus resulting in an almost trapezoidal geometry of the permanent magnets 8 in axial projection.

The embodiment according to FIG. 2 clarifies the minimal effort associated with realising the auxiliary rotor 5 according to the proposed principle.

FIGS. 3 and 4 explain the path of the magnetic flux and the magnetization direction of the magnets of the auxiliary rotor by way of exemplary embodiments.

In detail, FIG. 3 shows the rotor core 7 according to the embodiment of FIG. 2, on which, as already described in FIG. 2, permanent magnets 8 alternate between north and south poles along the circumference in axial direction. According to their orientation, the permanent magnets 8 are accordingly designated alternately as north pole N and south pole S. The path of the magnetic flux generated by the permanent magnets is shown by arrows for a pair of permanent magnets 8.

FIG. 4 shows the path of the magnetic flux in the rotor by way of example. The magnetic flux axially extends from the permanent magnets 8 into the main rotor, and then radially via the air gap into the stator (not shown here). The flux in the stator extends from one pole to the adjacent pole, as in conventional machines. In the auxiliary rotor the flux closes via the iron yoke 7 from one magnetic pole to the adjacent magnetic pole.

FIG. 5 shows an exemplary embodiment of the rotor for an electrical machine according to the proposed principle, comprising the main rotor 2 and the auxiliary rotor 5, which comprises two axial flux rotors situated opposite to each other. The associated magnetization of the main rotor and of the auxiliary rotors is shown by arrows. In other words, the excitation of the rotor poles ensues three-dimensionally. The permanent magnets of the main rotor 2 are always drawn upon to generate the torque. The auxiliary rotor 5 is provided in order to increase the flux density and thus the torque.

Ferrite magnets or magnets comprising rare earths can be used as permanent magnets.

The magnets consisting of rare earths can be used for the main and the auxiliary rotor, resulting in ultra-high power density but also higher cost.

In another embodiment the main rotor 2 comprises rare earth magnets, whereas ferrite magnets are used for the permanent magnets of the auxiliary rotor. Vice versa is of course also a possibility, resulting in a high power density with average costs.

NdFeB, neodymium iron boron, or SmCo, samarium cobalt can be used as rare earths for the magnets, for example.

Alternatively, ferrite magnets can be used in the main and auxiliary rotors, leading to average to high power density and low costs.

In deviation to the exemplary embodiments shown in FIGS. 1 to 5, a different rotor design can also be used, in which the auxiliary rotor 5 comprises only one axial flux rotor, which is arranged on one side of the main rotor 2.

FIGS. 6 to 8 show individual steps in the production of a rotor for an electrical machine according to the proposed principle on the basis of an exemplary embodiment.

FIG. 6 shows the main rotor 2, which is designed as a radial flux rotor herein. For this purpose, permanent magnets 9 are designed as substantially two-dimensional magnets, which predominantly extend in radial and axial directions, but have only a small thickness in the circumferential direction. The permanent magnets 9 are distributed along the circumference. The iron core of the rotor is arranged between the permanent magnets 9. The permanent magnets 8 of the axial flux rotors are attached to the end surface on both sides of the main rotor 2, i.e. in the axial direction, and notably directly on the lateral pole surfaces of the main rotor. The substantially annular iron core 7, which serves as rotor yoke, is attached to the rear side of each of these magnets 9 of the axial flux rotors. This is shown in FIG. 7.

FIG. 8 shows the assembled rotor, comprising the main rotor with the radial-flux-generating permanent magnets 9 as well as the auxiliary rotor comprising the two axial flux rotors each with the annular iron cores 7 and the permanent magnets 8 arranged therebetween.

FIG. 9A to 9C show an exemplary embodiment of an electrical machine with a stator 1 and with a rotor according to the proposed principle, comprising a main rotor 2 and an auxiliary rotor 5, comprising two axial flux rotors 5 situated opposite to each other.

Proceeding from a rotor pursuant to FIG. 7, which is not re-described herein, FIG. 9A additionally shows the stator 1 with slots, which can later accommodate a winding. It is evident that the axial extension of the stator 1 corresponds to that of the main rotor 2. An axial flux rotor of the auxiliary rotor 5 is arranged on both end surfaces of the main rotor 2, as shown assembled in FIG. 9B.

Proceeding from the electrical machine with stator 1 and the exemplary rotor according to the proposed principle, comprising the main rotor and the auxiliary rotor, FIG. 9C additionally shows the stator 1 with inserted stator winding. It is evident that the stator winding has winding heads 4 on both end surfaces of the stator 1, the axial extension of each approximately corresponding to that of the auxiliary rotor 5 on both sides of the main rotor 2.

In principle, the illustration in FIG. 9C thus corresponds to the schematic cross-section shown in FIG. 1, wherein no axis 3 is drawn in FIG. 9A to 9C.

Alternative rotor topologies according to the proposed principle are described in the following on the basis of further examples.

The embodiment in FIG. 10A to 10C shows an example of a main rotor with magnets arranged in V-shape in an interred manner.

Contrary to the representation in the embodiment of FIGS. 6 to 8, for example, FIG. 10A shows no radially and axially oriented permanent magnets, which have only a small extension in the circumferential direction, and instead permanent magnets arranged in v-shape in cross-section of the main rotor 21.

FIG. 10B shows a perspective view of the main rotor 21 of FIG. 10A with magnets configured in v-shape.

FIG. 10C also shows the main rotor 21 of FIG. 10A. The surfaces in the radial direction outside the v-shaped magnets are shaded therein. The latter constitute the contact surfaces between the main rotor and the magnets 8 of the axial flux rotors of the auxiliary rotor attached in axial direction to the end surface.

Said magnets of the auxiliary rotor are drawn in FIG. 11A and are precisely adjusted flush to the shaded contact surface of FIG. 10C. They are indicated by the reference numeral 81 in FIG. 11A.

FIG. 11B shows said permanent magnets 81 of the auxiliary rotor attached to the annular yoke 71.

FIG. 12A shows the already described main rotor 21 with v-shaped interred magnets together with the also previously described axial flux rotors of the appropriate auxiliary rotor, comprising the correspondingly adjusted permanent magnets 81 and the rotor yoke 71 on both sides of the machine.

FIG. 12B shows the embodiment of FIG. 12A, but in the assembled state of an exemplary embodiment of a rotor according to the proposed principle.

In analogy to FIG. 9A to 9C, FIGS. 13A, 13B, 14A and 14B show an electrical machine with the already explained stator 1 and the winding inserted therein with the winding heads 4, but here only for the rotor with v-shaped interred magnets in the main rotor 21 and the auxiliary rotor adjusted thereto pursuant to FIG. 11A to 12B. For the sake of avoiding repetitions, the structure is not re-described at this juncture. FIG. 14B shows the electrical machine in a completely assembled state.

While the preceding stator windings of all the embodiments shown each have a distributed winding, embodiments of the following representation pursuant to FIGS. 15A and 15B show an embodiment of an electrical machine with a stator for a concentrated winding.

The stator with slots for accommodating a concentrated winding is furnished with reference numeral 11 in FIG. 15A. A coil of the tooth-concentrated winding 13 is placed around the teeth 12, which are each formed between adjacent slots of the stator 11. Such tooth-concentrated winding thus comprises a plurality of individual coils, which are wound around each tooth of the stator 11. Said stator 11 interacts with a main rotor 21, which has v-shaped interred magnets in this example and has already been described above. Stator 11 and main rotor 21 have the same axial extension.

Proceeding from the embodiment in FIG. 15A, FIG. 15B shows the latter with additionally assembled auxiliary rotor, comprising two axial flux rotors, which correspond to the embodiment of FIG. 11A to 14B, and are thus not re-described at this juncture. The electrical machine pursuant to FIGS. 15A and 15B comprises twelves slots in the stator and eight poles in the rotor.

The winding heads in a concentrated winding, as shown in FIG. 15B for example, are shorter than the winding heads in a distributed winding, as shown in FIG. 14B for example. In particular in axially very compact machines, the axial extension of the winding heads is still not negligible, and therefore the proposed principle of the better exploitation of space in the event of amplified magnetic flux has a positive effect there.

Proceeding from the principal image of the proposed principle pursuant to FIG. 1, the subsequent FIG. 16 shows another advantageous use of the proposed principle, namely in a claw pole rotor, as used, for example, in conventional motor vehicle alternators. The claw pole rotor is named as such due to the fact that claws from two rotor halves alternately interlock and are thus alternately magnetized in south and north poles.

FIG. 16 now shows an auxiliary rotor 51, which, as also basically provided in the preceding exemplary embodiments, comprises two axial flux rotors, each having an annular iron core 72 with permanent magnets 8 arranged on the end surfaces and facing each other. However, the distances between the permanent magnets 8 in the circumferential direction are greater, for example, in the embodiment pursuant to FIG. 3, in order to allow for lateral teeth 73 to stand between the permanent magnets.

FIG. 17 shows how such teeth 73 are each adjusted to the main rotor 22 of the claw pole machine. Said main rotor 22, as shown exemplarily in FIG. 17, is a conventional claw pole rotor. The main rotor 22 has a single excitation coil 82 (as shown exemplarily in FIGS. 20 to 22), which is wound in the circumferential direction. The teeth 73 of the annular iron core 72 are, as shown in FIG. 18 after the assembly of the embodiment of FIG. 17, assembled directly on the lateral surfaces of the claw pole rotor and are adjusted there flush with the rotor teeth along the external circumference of the main rotor 22.

The assignment of the teeth of the main rotor 22 to the laterally arranged teeth 73 of the auxiliary rotor or the permanent magnets 8 is redrawn in FIG. 19 in an unwound state for the sake of better understanding. The arrows show the magnetization direction of the permanent magnets 8.

FIG. 20 shows a section of a perspective illustration of an exemplary embodiment of an electrical machine with a stator 1 and with a claw pole rotor according to the exemplary embodiment pursuant to FIGS. 16 to 19. The path of the magnetic flux of the permanent magnets between rotor and stator is plotted as a dashed line, wherein arrows designate the direction of flux. It is evident that the main components of the flux density of the magnets flow only axially and in the circumferential direction through the rotor area. The length of the path of the magnetic flux for the axial rotor components is over 50% shorter compared with a conventional claw pole rotor. The flux density in the air gap, which is generated by such components, is thus more effective than that of the conventional claw pole rotor. In other words, the addition of the auxiliary rotor in the claw pole machine perceptibly increases the flux density in the air gap.

FIG. 21 shows the path of the magnetic flux of the permanent magnets in the rotor according to the proposed principle on the basis of a claw pole machine, wherein the stator 1 is omitted from FIG. 20 for the sake of better visibility.

FIG. 22 shows an example of a claw pole machine according to the proposed principle for use in automobiles. The machine in the embodiment of FIG. 22 has an active length of 50 mm, 16 poles, 48 slots in the stator, three electrical phases and a field winding designed for DC current of 5 A. Only a section of approximately ⅛ of the geometry is shown. The stator winding is not illustrated.

In the following FIGS. 23 and 24, for hard ferrite magnets in FIG. 23 and for neodymium magnets in FIG. 24 respectively, the magnetic flux linkage is plotted over time on the basis of the rotor field, on the one hand for a machine according to the proposed principle as claw pole machine and on the other hand for a conventional claw pole machine.

It is evident that the magnetic flux is increased by approximately 60% with the claw pole rotor according to the proposed principle with ferrite magnets. Indeed, said increase is 150% when neodymium magnets are used.

Thus, clear advantages can be achieved when copper losses are avoided.

The invention claimed is:

1. An electrical machine comprising:
a stator; and
a rotor comprising:
   a main rotor, which can be rotated about a longitudinal axis and which is free of permanent magnets, the main rotor being configured as a claw pole rotor; and
   an auxiliary rotor, comprising two axial flux rotors,
wherein each the axial flux rotors
   is rotatable about the longitudinal axis,
   is arranged in an axial direction adjacent to the main rotor, and
   has an annular iron core with permanent magnets arranged on end surfaces thereof, the permanent magnets facing each other, teeth of the annular iron core being assembled directly on the lateral surfaces of the claw pole rotor and being adjusted there flush with rotor teeth along an external circumference of the main rotor, and
wherein the main rotor
   comprises a single excitation coil which is wound in a circumferential direction, and
   has substantially the same axial extension as the stator of the machine.

2. The electrical machine according to claim 1, wherein the main rotor is designed as a radial flux rotor.

3. The electrical machine according to claim 1 or 2, wherein for each of the axial flux rotors, the permanent magnets are axially secured on the annular iron core and are distributed along the circumference thereof.

4. The electrical machine according to claim 3, wherein the permanent magnets comprise rare earths.

5. The electrical machine according to claim 3, wherein the permanent magnets comprise ferrite magnets.

6. The electrical machine according to claim 1 or 2, wherein the axial flux rotors are arranged opposite to each other.

7. The electrical machine according to claim 1, wherein the permanent magnets of the auxiliary rotor are each secured laterally on the main rotor.

8. The electrical machine according to claim 1, wherein winding heads of a winding of the stator are present, and
   wherein an axial extension of the auxiliary rotor corresponds to an axial extension of the winding heads.

* * * * *